UNITED STATES PATENT OFFICE.

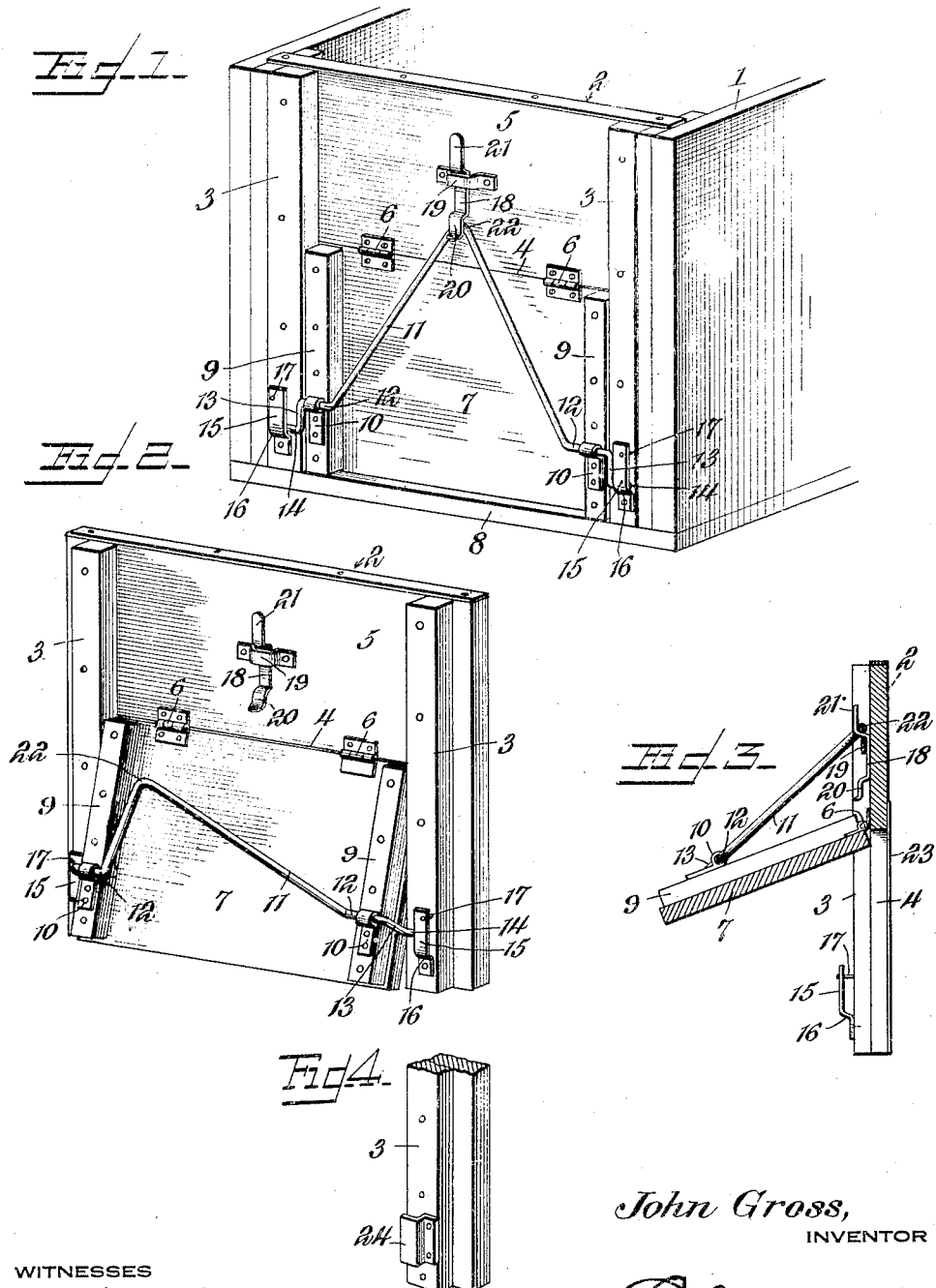

JOHN GROSS, OF CARROLL, IOWA.

WAGON END-GATE.

1,374,297.  Specification of Letters Patent.  Patented Apr. 12, 1921.

Application filed May 24, 1919. Serial No. 299,456.

*To all whom it may concern:*

Be it known that I, JOHN GROSS, a citizen of the United States, residing at Carroll, in the county of Carroll and State of Iowa, have invented a new and useful Wagon End-Gate, of which the following is a specification.

This invention has reference to wagon end gates, and its object is to provide a controllable end gate which may be closed grain tight or opened to various degrees at the will of the operator without the necessity of removing the end gate from the wagon.

In accordance with the invention, the end gate is made to fit into the end of the wagon body like an ordinary end gate, and is provided with a hinged section with a controlling lever thereon having terminal portions on opposite sides to engage in keepers on the fixed part of the end gate, while a holding structure is provided for the lever, retaining the latter to hold the end gate closed or to hold it wide open at the will of the operator.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is a perspective view of the end gate in place on a wagon body, with the controllable part of the end gate closed.

Fig. 2 is a perspective view of the end gate separate from the wagon body but showing the controllable part in a partially open position.

Fig. 3 is a central front to rear section of the end gate showing it in the wide open position.

Fig. 4 is a perspective view of a modified form of keeper.

Referring to the drawing, there is shown a portion of the rear of the wagon body 1 which may be taken as typical of any suitable wagon body, particularly one for transporting grain and other materials to be dumped into a chute. The wagon body may be of standard size and in place of the ordinary end gate there is provided an end gate 2 which when once placed in position may there remain, since the end gate need not be removed for dumping purposes. Near the side portions of the end gate are upright battens 3, between the inner faces of which the lower portion of the end gate is provided with a through opening 4 above which the end gate is closed all the way across, as indicated at 5. Secured at the upper edge by hinges 6 to the lower edge of the closed portion 5 of the end gate is a pendent gate board 7 of a size to closely yet freely fit the opening 4 from the solid portion 5 of the end gate to the floor 8 of the wagon. The hinged gate board 7 is also provided at the opposite edge portions with cleats or battens 9 of about the same thickness as the battens 3. Secured to the cleats 9 near the lower ends are pivot brackets 10 constituting journal supports for a substantially V-shaped lever or bail 11 with each end of the lever out-turned, as shown at 12, and there passed through a corresponding bracket 10. Beyond each out-turned portion 12 the lever is formed into a crank end 13 with the extremity 14 of the crank end substantially parallel but offset from the adjacent out-turned extension 12.

Fast to each batten 3 near its lower end so as to be in the path of the crank extremity 14 is a keeper 15 in part offset from the batten and having a bent end 16 by means of which the keeper is secured to the batten. The other end of the keeper is in spaced relation to the batten and is held in such position by a stop pin 17 preventing the offset end of the keeper from moving away from the batten.

On the fixed or solid part 5 of the end gate a sliding latch 18 is secured by means of a strap 19 suitably bent to permit sliding movements of the latch toward and from the opening 4, said latch being located about midway of the width of the gate. One end of the latch is bent into a retaining finger 20 and the other end of the latch is bent into another finger 21.

When the gate 7 closes the opening 4 the ends 14 of the lever 11 engage behind the keepers 15 and crank ends of the lever act as cams, forcing the gate tightly into the opening 4 as the mid part 22 of the lever or bail 11 which may be quite sharply bent, is moved toward the solid part 5 of the end gate. The latch 18 has a sufficient range of movement to carry the finger 20 out of the path of the bend 22 of the lever or bail 11 and the latch may be then moved so that the finger 20 is in the path of the end 22 of the lever or bail 11, thereby holding the gate 7 firmly in place against any liability of loosening. The cam action of the ends of the lever or bail 11, with respect to the keepers 15, permits slight or moderate opening of the gate 7 so that any desired amount of loose grain may be allowed to escape from the wagon. This is important since elevators on farms usually have small pits and cannot convey a very large amount of grain in a short time, wherefore a control of the size of the opening from the wagon to the conveyer is of importance.

In the case of potatoes or ear corn, or the like, the gate may be opened wide with the end 22 of the cam lever engaging over the end 21 of the latch 18, such position being shown in Fig. 3. The gate 7 is made to close against backing strips 23 which may be conveniently made of metal and limit the closing movement of the gate.

Instead of providing keepers 15 constructed as shown in Figs. 1, 2 and 3, each keeper may comprise a plate 24 of metal wider than the keeper 15 and arranged at about right angles to the position of the keeper 15 so that the cam end 14 of the lever or bail 11 will move crosswise of the keeper instead of lengthwise thereof, the same result of holding the gate in the closed position or permitting it to be opened to a small extent being present. The keeper 24 is shown separately in Fig. 4.

What is claimed is:—

1. An end gate structure comprising a hinged gate-board, a latch above the gate-board, and means on the gate-board for locking the same in closed position or for sustaining the same in wide-open position, said means being engageable with one end of the latch when functioning as a lock and being engageable with the opposite end of the latch when functioning as a support.

2. An end gate structure provided with a hinged gate-board, latch means on the gate structure, a bail on the gate-board for holding the same in closed position, or for partially opening the same, or for sustaining the same in wide-open position, said bail being engageable with the latch means when in closed and wide-open position and being free of the latch means when the gate is in a partially open position.

3. An end gate structure comprising an end gate with a discharge opening therethrough at its lower end, a gate-board for the opening pendently hinged to the end gate, a bail extending across the gate-board and pivoted thereto near its lower end, the bail having crank extremities extending beyond the sides of the gate-board, keepers in the path of the crank extremities, for engagement thereby, and a latch above the gate, said latch being shaped at one end to engage the lever when the gate is shut and at the other end to sustain the lever with the gate open.

4. An end gate structure comprising an end gate with a discharge opening therethrough at its lower end, a gate-board for the opening pendently hinged to the end gate, a bail extending across the gate-board and pivoted thereto near its lower end, the bail having crank extremities extending beyond the sides of the gate-board, keepers in the path of the crank extremities for engagement thereby, and a sliding latch on the gate above the gate-board, said latch being movable up and down and with the opposite ends in the form of hooks, the lower end of the latch being positioned to engage over and hold the mid-portion of the bail close to the gate with the gate closed and the other end of the latch being shaped to sustain the bail by its mid-portion with the gate wide open.

5. An end gate structure provided with a pendently hung gate and an operating lever therefor in the form of a bail pivoted to the lower end portion of the gate-board and engaging corresponding portions of the end-gate, the bail having crank extremities in substantially the plane of the body of the bail and serving to control the opening of the gate-board, and keepers for the extremities of the cranks fast to the end-gate, said keepers opening upwardly to allow the escape of the crank ends in an upward direction, whereby the gate may be opened to various extents or to the full extent at the will of the operator.

In testimony, that I claim the foregoing as my own, I have hereto affixed my signature.

JOHN GROSS.

Witnesses:
 Leo F. Wielond,
 O. M. Gross.